BANDWIDTH COMPRESSOR AND EXPANDER

Filed Dec. 30, 1966 4 Sheets-Sheet 1

INVENTORS.
ARNOLD I. KLAYMAN
LEONARD J. GENEST
BY M. Jabin
ATTORNEY

INVENTORS.
ARNOLD I. KLAYMAN
LEONARD J. GENEST
BY [signature]
ATTORNEY

INVENTORS.
ARNOLD I. KLAYMAN
LEONARD J. GENEST
BY M. Jabin
ATTORNEY

BANDWIDTH COMPRESSOR AND EXPANDER

Filed Dec. 30, 1966 4 Sheets-Sheet 4

INVENTORS.
ARNOLD I. KLAYMAN
LEONARD J. GENEST
BY M. Jabin
ATTORNEY

United States Patent Office 3,499,996

Patented Mar. 10, 1970

3,499,996

BANDWIDTH COMPRESSOR AND EXPANDER

Arnold I. Klayman, Marina del Rey, and Leonard J. Genest, Inglewood, Calif., assignors to Octronix, Inc., a corporation of California Filed Dec. 30, 1966, Ser. No. 606,432
Int. Cl. H04b *1/66*
U.S. Cl. 179—15.55 8 Claims

ABSTRACT OF THE DISCLOSURE

An electronic system is disclosed for the transmission of high-bandwidth intelligence over a low-bandwidth communication channel by means of frequency compression and expansion. The bandwidth compressor and expander circuits utilize two basic parts or systems, namely a voiced system and an unvoiced system. In recognition of the fact that there is much redundancy in voiced information in normal speech, the voiced system reduces the information to the minimum redundancy level by sampling every Nth pitch cycle and transmitting all of the frequency components associated with that basic pitch cycle at a reduced frequency. The expander circuit reproduces the original information by reproducing the divided pitch cycle N times and at N times the divided frequency.

In the field of electronic communications, telephone, telegraph, teletype, facsimile, radio, television, and any other transmission of data, it is desirable to use as little of the available frequency spectrum as possible, while still transmitting all of the desired information.

The reason for this is simply that the less space in the spectrum that must be used to transmit a given amount of information, the more room will be available for additional channels of communication. For instance, a common telephone speech channel covers the frequency range of from approximately 300 to 3,000 cycles per second. With bandwidth compression, this could be cut in half, or to one-tenth, or even greater and still transmit the same information. In other words, two or ten or more phone conversations could conceivably be carried in the channel space normally required by just one. This philosophy can be extended to all forms of electronic communications previously mentioned plus the fields of hi-fi, stereo, electronic organs and other musical instruments, etc. Television channels consume an enormous amount of channel space. Use of a bandwidth compressor would provide space for many more television channels and make video tape recording much simpler and less costly.

A typical electronic communication channel involves a data input source, an input transducer, a transmitter, a receiver, and an output transducer. If the data being transmitted is the spoken human voice, the input tarnsducer could be a microphone, the transmitter could be a radio transmitter, the receiver could be a radio receiver, and the output tarnsducer could be a loudspeaker, which finally completes the channel by turning the electrical impulses back into the original accoustical data.

If, after the entering data is converted to equivalent electrical impulses by the transducer, these impulses are altered by an encoder, the data can still be processed at the receiver by providing a decoder which performs the exact opposite function of the encoder. In the case of a bandwidth compressor the encoder is a device which instantaneously lowers all frequency components entering it by a given amount and the decoder conversely raises all frequency components entering it by the same amount. For example, let us say that a 1,000 cycle per second sine wave is being transmitted and it is desired to compress the bandwidth by ½. The encoder would therefore have an output of 500 cycles per second for an input of 1,000 cycles per second and the decoder would have an output of 1,000 cycles per second for an input of 500 cycles per second. A second requirement is that the amplitude throughout the system must be preserved. In a practical system, the encoder and decoder must operate over the whole frequency spectrum which is being utilized by the data being transmitted. The band width reduction capability should be as high a ratio as is possible depending on system requirements. The example given above of 2 to 1 reduction should only be construed as an example and could just as well have been some other ratio.

It is an object of the present invention, therefore, to provide a novel bandwidth compressor circuit.

It is another object of the present invention to provide a novel bandwidth expander circuit.

It is still another object of the present invention to provide a bandwidth compressor and expander circuit.

It is yet another object of the present invention to provide a circuit for the transmission of high-bandwidth intelligence over a low-bandwidth communication channel by frequency compression and expansion.

According to one embodiment of the present invention, a bandwidth compressor and expander circuit comprises two basic parts or systems, a voiced system and an unvoiced system.

Voiced information or sound is that sound produced by the vibration of the vocal cords in the throat. Vocal cords vibrate at a basic rate of between 60 cycles per second (c.p.s.), or Hz.; and as high as 800 c.p.s., for most human beings. The basic waveshape of the vocal cords is a sawtooth which is rich in harmonic frequencies. The various cavities of the mouth and throat in combination with the tongue and lips resonate at various harmonics of the fundamental pitch. The individuality of voice from person to person is a function of the harmonic resonances of that person.

There is a great deal of redundancy in voiced information in normal speech. The voiced system of the present invention works on the principle of reducing the information to the minimum redundancy level by sampling certain selected non-adjacent pitch cycles, such as every fourth pitch cycle, by way of example only, and transmitting all of the frequency components associated with that basic pitch cycle at a reduced frequency. The expander circuit then reproduces this divided pitch cycle four times and at four times the divided frequency, thereby reproducing the original information.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

Figure 1:
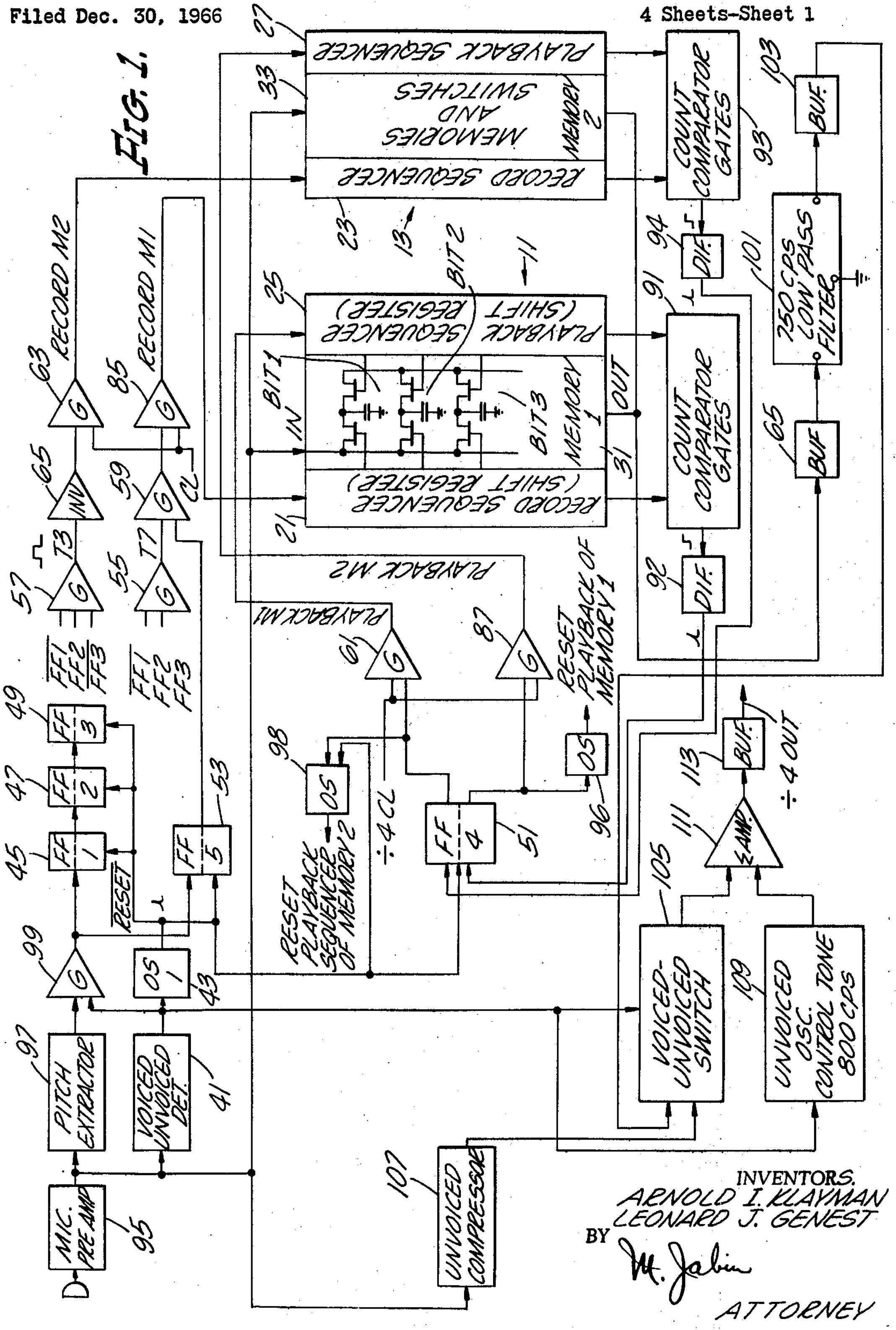
FIGURE 1 is a block diagram of a bandwith compressor circuit according to the present invention.

Turning now to the drawings, FIGURE 1 shows a compressor circuit including analog memory banks 11 and 13 and the logic circuits associated therewith. Each analog memory bank has 128 bits of memory capable of storing voltage levels with 128 input gates for charging the memories and 128 output gates for detecting the levels in the individual memory bits.

Figure 2:
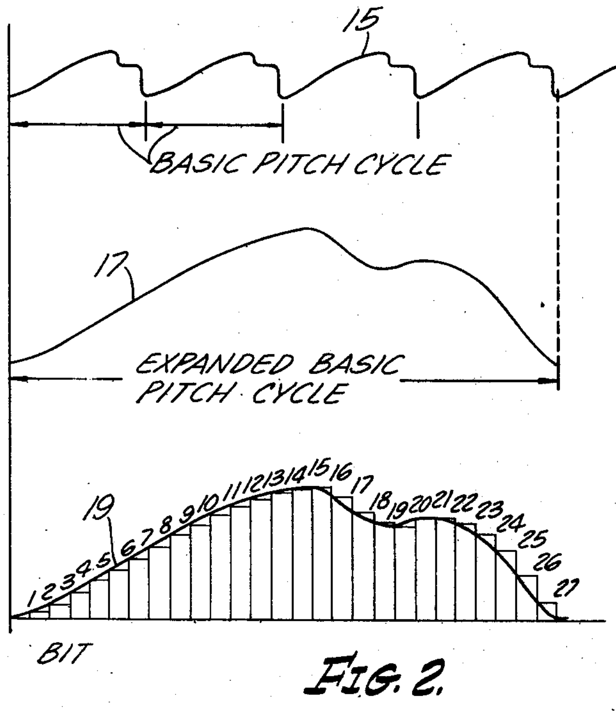
FIGURE 2 shows waveforms of basic pitch cycles.

The function of the memory bank is to store one basic pitch cycle of information completely, for playback at a later time and at a slower speed. If a group of basic pitch cycles looks as shown by curve 15 in FIGURE 2, and one basic pitch cycle, when expanded, looks as shown by curve 17 in FIGURE 2, when the pitch cycle is scanned into the memory bank 11, the memory bits would assume levels that will follow the waveshape of the original, as shown by curve 19.

With the waveshape being remembered by the memory bank, it is possible to read the information out of the memory bank at any speed desired, and still maintain the same waveshape. The principle of operation is to store one basic pitch cycle out of every four into alternate memory banks.

The memory banks 11 and 13 are equipped, in addition to their memories, with record sequencers 21 and 23, playback sequencers 25 and 27, and memories and switches 31 and 33, respectively, as shown in FIGURE 1. The sequencers 21 and 23 are each in essence a 128 bit counter and decoder that will sequentially select the memory bits for recording or playback.

During the time that memory bank 11 (memory 1) is in the record mode, memory bank 13 (memory 2) is being scanned by playback sequencer 27 at one-fourth of the record speed, except for the first pitch cycle after the voiced-unvoiced detector 41 is switched to the voiced mode.

For the first cycle, when the voiced-unvoiced detector 41 switches to the voiced mode, one-shot or monostable multivibrator 43 (OS 1), which operates on a positive going rise time, provides a reset for bi-stable multivibrators, or flip-flops, 45 (FF1), 47 (FF 2) and 49 (FF 3), and a set for flip-flops 51 (FF 4) and 53 (FF 5).

Flip-flops FF 1, FF 2 and FF 3 form a divide by 8 (÷8) binary counter, with T1 through T8 bit times occurring at the basic pitch rate. At the time the one-shot multivibrator 43 provides a reset, FF 1, FF2 and FF 3 will be in T1 bit time. Record sequencers 21 and 23 of memories 1 and 2, respectively, are gated at T7 and T3 bit times by gates 55 and 57. It is necessary, however, to begin recording the input waveshape of the first basic pitch cycle immediately, and it is also necessary to play back the divided information immediately. That is accomplished by using FF 4 and FF 5. Flip-flop FF 5 opens gate 59 and allows the clock to begin recording into memory 1 while FF 4 opens gate 61, allowing the ÷4 clock to start the playback sequencer 25 at one-fourth the record speed.

At T3 time, gate 63 opens, allowing the clock to begin the record sequencer 23 of memory 2 for one basic pitch cycle. During this time, playback sequencer 21 of memory 1 is dumping the information in memory 1 into the output buffer 65 at one-quarter rate. Gate 63 is also coupled to the output of gate 57 through inverter 65.

Figure 3:
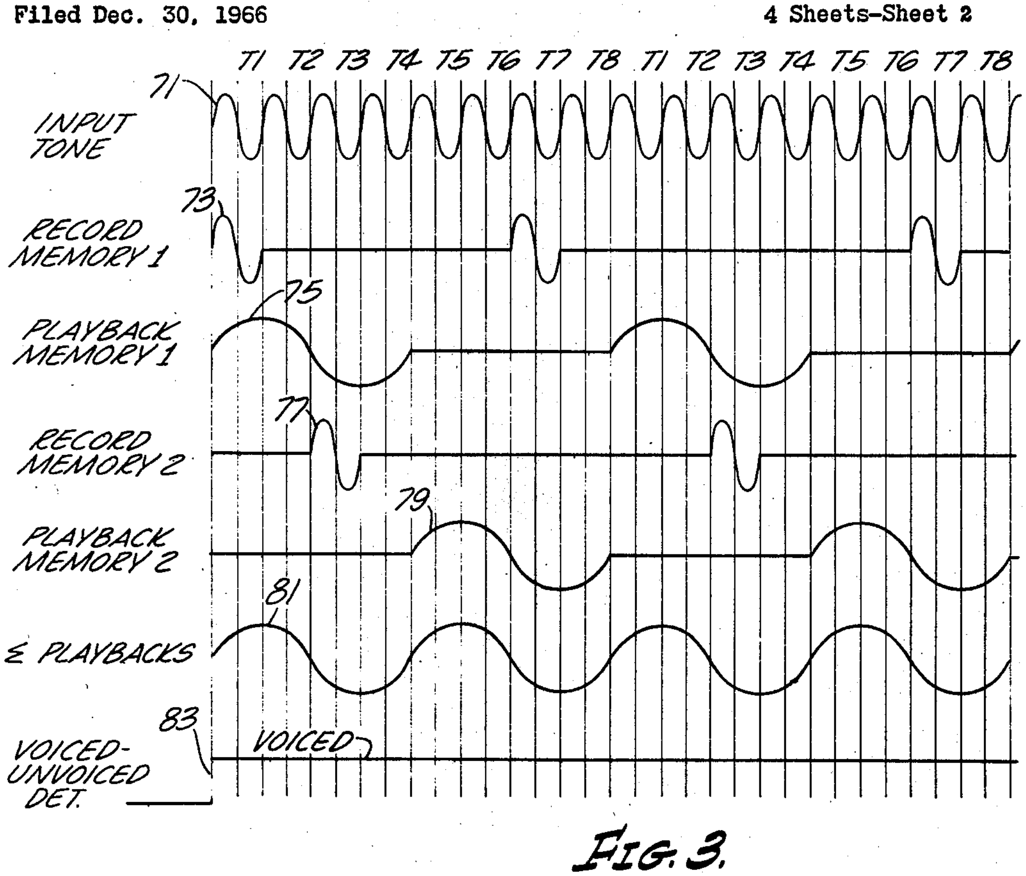
FIGURE 3 shows the relationships of various waveforms present in the system shown in FIGURE 1.

FIGURE 3 shows the relationship between the waveforms 71 of the input tone, 73 of the record sequencer 21, 75 of playback sequencer 25, 77 of record sequencer 23, and 79 of playback sequencer 29. Waveform 81 represents the sum of the playbacks, and waveform 83 shows the relationship to the output of the voiced-unvoiced detector 41.

Each record sequencer and memory has 128 bits of information capability, but not all of those bits are always used. The frequencies that the described system is designed to reproduce is 60 c.p.s. to 3,000 c.p.s. In accordance with the sampling theorem, the lowest sampling frequency must be 2.5 times the highest anticipated input frequency. This means that the sampling frequency must be 2.5 times 3,000, or 7,500 c.p.s. The basic clock rate (CL), therefore, is 7,500 c.p.s.

By way of example, if a pitch frequency of 100 c.p.s. occurs, the time between pitch cycles is 10 milliseconds. The record gates 85 and 61 can only open and allow clock pulses for one basic pitch cycle. Thus, for 10 milliseconds, only 75 memory bits will be used in that particular memory. At count number 75, the record gate will close and the record sequencer will stop.

The playback sequencers 25 and 27 are controlled by gates 61 and 87, respectively, and by FF 4. The position of FF 4 will determine whether gate 61 or 87 will open, and thereby allow the ÷4 clock into the proper playback sequencer.

Flip-flop FF 4 is controlled by the count comparator gates 91 and 93. The outputs of count comparator gates 91 and 93 are fed to differentiators 92 and 94, respectively, and then to FF 4. Each of the count comparator gates is a series of gates which monitor the count position of the record sequencer versus the playback sequencer.

By way of example, if the record sequencer stopped in a count 75 position, when the playback sequencer starts and reaches count 75, the count comparator gates will give an output which will change FF 4 to the opposite state, thereby starting the scan of the other playback sequencer on the other memory.

The outputs of FF4 are also fed to one-shot multivibrators 96 and 98, the outputs of which are used to reset playback sequencers 25 and 27, respectively.

The reason for using two memories is that the basic pitch of voice is continuously changing at a slow rate which has a maximum of 25 c.p.s. For this reason, it is possible to sample every fourth basic pitch cycle and to slow it down four times for transmission. This information is then interpolated at the expander into an extremely close approximation of the original information, as will be explained herein.

As a result of the fact that the basic pitch will vary between every fourth sample time, if a single memory were used, error would result because of insufficient or excessive playback time, depending upon whether the pitch increased or decreased in frequency by the fourth pitch cycle. This error is eliminated by the use of a secondary memory.

The purpose of connecting voiced-unvoiced detector 41 to the output of microphone preamplifier 95 is to indicate the nature of the sounds being produced, as to whether they are being produced by the vocal cords or whether they are lip sounds or wind sounds, or any other noise that is not produced by the vibration of the vocal cords.

The reason for connecting pitch extractor 97 between the output of microphone preamplifier 95 and gate 99 is to regenerate the basic pitch frequency of the vocal cords from all the other harmonic frequencies present. The output of gate 99 is supplied to FF 1 and FF 5.

The outputs of memories 1 and 2, after passing through buffer 65, are fed through a 750 c.p.s. low-pass filter 101 to remove all the sampling spikes, leaving only the voice ÷4 information. This information, after passing through buffer 103, is fed to the voiced-unvoiced switch 105, which allows voiced information to pass when the voiced-unvoiced detector 41 is in the voiced mode. Voiced-unvoiced switch 105 allows unvoiced information from unvoiced compressor 107 to pass when the voice-unvoiced detector 41 is in the unvoiced mode. Unvoiced compressor 107 is also connected to the output of microphone preamplifier 95.

During the time that the voiced-unvoiced detector 41 is in the unvoiced mode, the unvoiced oscillator 109 is gated on and summed through summing amplifier 111 with the output of the voiced-unvoiced switch 105. The output of amplifier 111, after passing through buffer 113, is the desired ÷4 output.

The function of the unvoiced oscillator 109 is to provide a control tone to the expander system to indicate whether the information being received is voiced or unvoiced.

Figure 4:
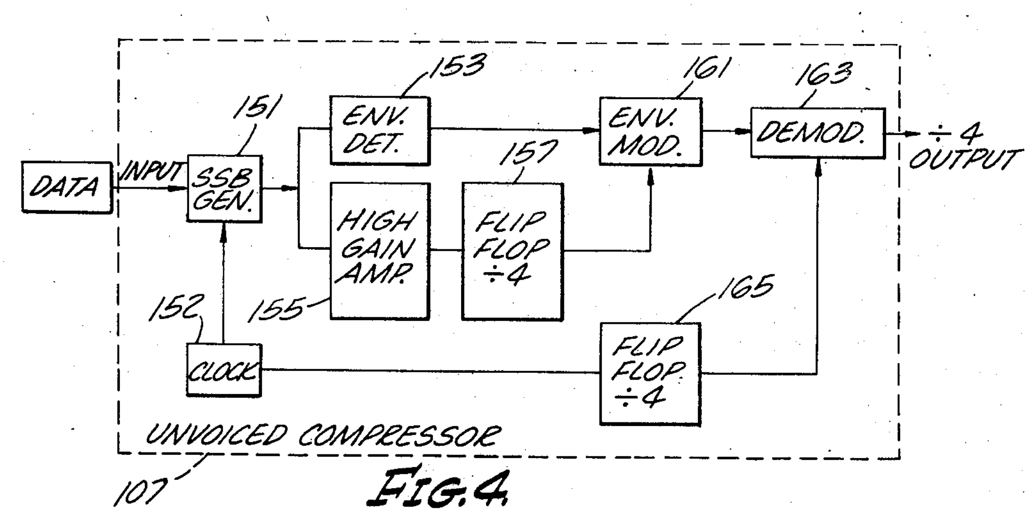
FIGURE 4 is a block diagram of the unvoiced compressor shown in FIGURE 1.

FIGURE 4 is a block diagram of the unvoiced compressor 107 shown in FIGURE 1. Single sideband (S.S.B.) generator 151 is a standard single sideband generator operating at some clock 152 frequency. Envelope detector 153 is connected to the output of generator 151 and produces a D.C. level that follows the envelope of the single sideband. High gain amplifier 155 produces square waves from the S.S.B. signal. The flip-flop divider 157 is a standard set of 2 binary dividers that produce a division of 4 for the output of amplifier 155.

The envelope modulator 161 remodulates the D.C. output of the envelope detector 153 with the divided-by-four output of the flip-flop divider 157.

The demodulator 163 beats the output of the envelope modulator 161 with the clock flip-flop divider 165 to produce the divided-by-four output.

Figure 5:
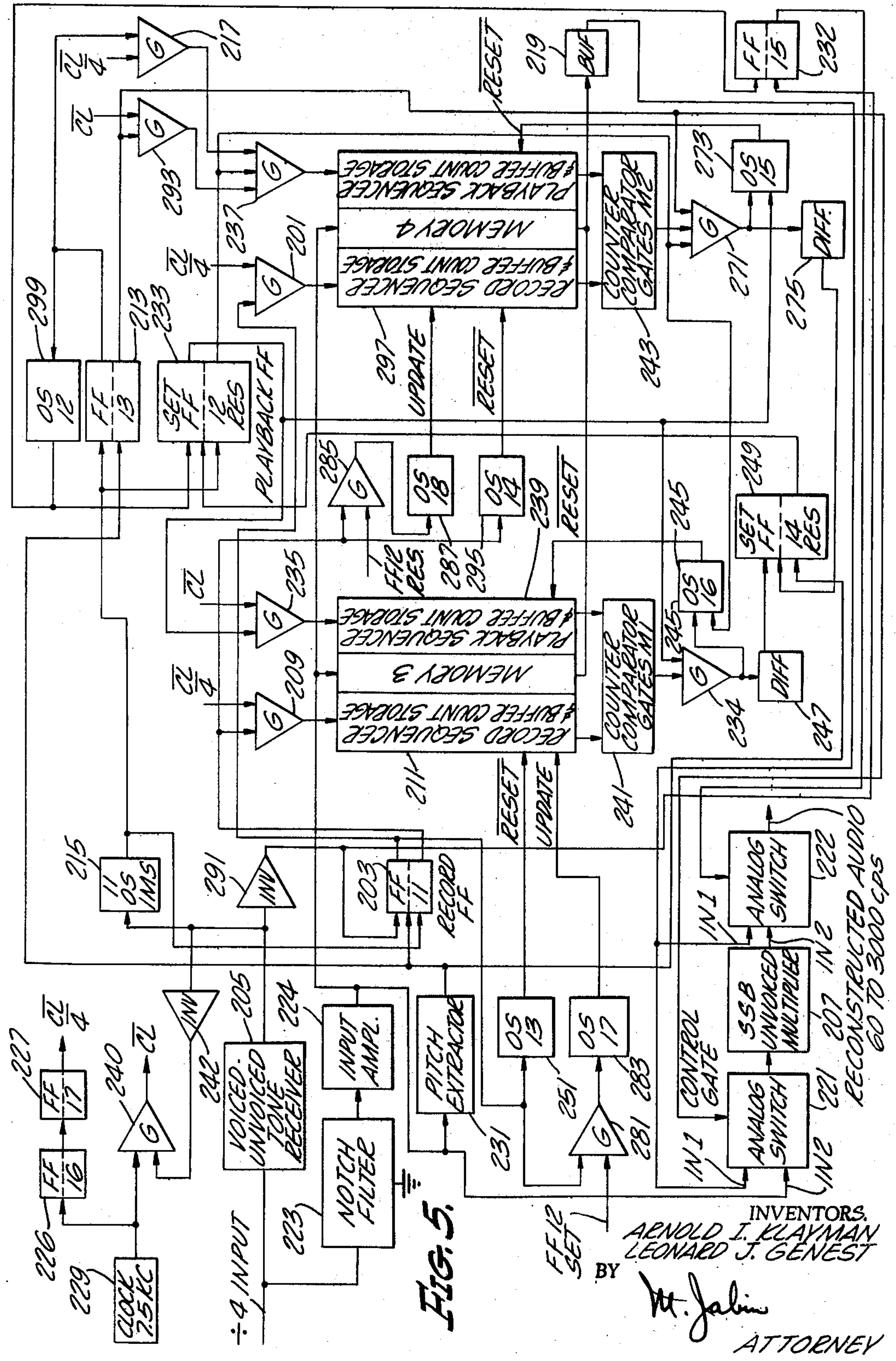
FIGURE 5 is a block diagram of a bandwith expander circuit according to the present invention.

FIGURE 5 shows an expander circuit, the function of which is to reconstruct the original frequencies from the received divided frequencies. It accomplishes this by basically recording each complete +4 pitch cycle into alternate memories. While one memory is being recorded into, the other memory is being repeatedly read out at four times the recording frequency. This results in the output frequency of the memory being 4 times the divided frequency, or equal to the original frequency at the input to the compressor.

As previously stated herein, the human voice has a maximum rate of change for frequency and amplitude of about 25 c.p.s. with the normal fluactuations being around 5 to 10 c.p.s. Since the pitch rate of voice changes very slowly, it has been found that if every fourth pitch cycle is put into memory and transmitted at one fourth the original pich frequency to the expander, and the expander records into memory the divided pitch cycle and then reproduces this divided pitch cycle four times and at four times the divided frequency, the result will be groups of four cycles at the output of the expander that are the same frequency as the original information.

If, for example, a sine wave oscillator is made to increase in frequency such that each successive cycle is $n$ times the frequency of the preceding cycle, then the compressor will sample every 4th cycle which will be $4n$ different from each other. Each one of the sampled cycles is stretched out over a period of four cycles, thus reducing the frequencies by a factor of four times. At the expander, each of the divided cycles is multiplied four times, thus producing four identical cycles to the divided cycle as far as waveshape is concerned, but at four times the frequency. Therefore, each succeeding group of four cycles will be $4n$ times the frequency of the preceding group, and all of the cycles within the group will be the same frequency.

It has been found that as long as each group is joined synchronously with the basic pitch rate, so that the waveshapes are continuous at the joining point, the ear cannot detect the fact that the frequency is changing in groups of four cycles insead of continuously, so long as the rate of change is under 25 c.p.s., as is the case for voice.

It has also been found that if each divided cycle is reproduced exactly four times and at four times the frequency it will not be possible to smoothly join the groups as required because varying pitch frequency will not always allow sufficient time for playback of all four cycles, or may allow time in excess of that required for the playback of the four cycles. Therefore, it is necessary to modify the number of times a divided cycle is played back to be less than four, or greater than four, depending on whether the pitch is increasing or decreasing.

Figure 6:
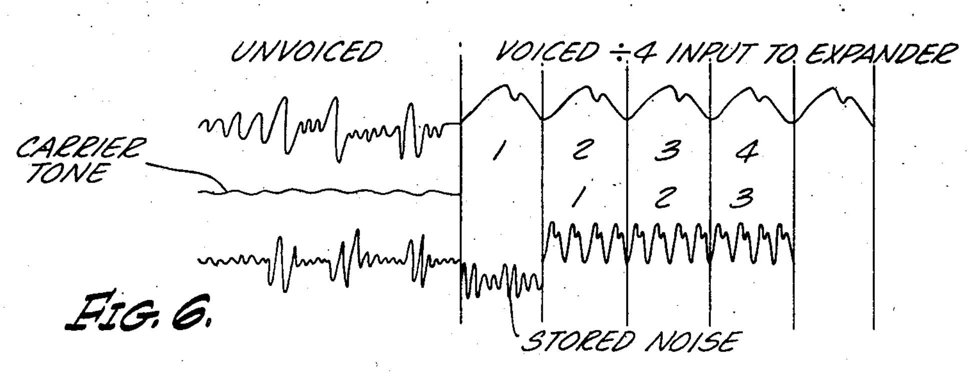
FIGURE 6 shows the relationships of various waveforms present in the system shown in FIGURE 5.

The expander, like the compressor, is split into two systems, one for voiced information and one for unvoiced or random information such as noise or "S" sounds or "H" sounds, etc. The expander is controlled by a carrier tone that is transmitted during unvoiced transmission and not transmitted during voiced information, as shown in FIGURE 6.

It is necessary that prior to playback of a divided cycle at four times the recorded frequency, the entire divided cycle be completely recorded before playback can start. This means that each group of 4 cycles is always one +4 pitch cycle late and is being played back during the recording of the second divided cycle in the other memory. It can therefore be seen that a gap will exists between the time that the unvoiced information stops and the time when the expanded voiced information will start. The system logic of FIGURE 5 is set up to eliminate this problem.

Memory 4 is held in the record mode by gate 201, flip-flop 203 (FF 11), the voiced-unvoiced tone receiver 205. This allows memory 4 to be storing the random noise at the same time that it is being fed to the single side band (SSB) unvoiced multiplier 207. The voiced-unvoiced tone receiver 205 is simply a narrow filter that is tuned to the tone control frequency and which is connected to an on-off tone detector.

Memory 4 contains 128 bits of memory storage that is continuously being updated with noise information. As soon as the voiced-unvoiced tone receiver 205 output indicates voiced information, FF 11 opens gate 209 allowing $\overline{CL}/4$ to start the record sequencer 211 and record the first +4 basic pitch cycle into memory 3. During this first +4 pitch cycle recording, flip-flop 213 (FF 13) has been set by one-shot multivibrator 215 (OS 11), which is connected to voiced-unvoiced tone receiver 205, so as to open gate 217 and allow playback of memory 4 at the same frequency as it was recorded, i.e., $\overline{CL}/4$.

The memory outputs are connected to a buffer 219 and then to analog switches 221 and 222. Analog switch 221 controls the input to the SSB unvoiced multiplier 207. During the unvoiced transmission, FF 13 controls analog switch 221 by selecting input 2 (IN 2), which is the divided input to the expander and to the SSB unvoiced multiplier 207.

The voiced-unvoiced carrier notch filter 223, removes the on-off tone that is transmitted to indicate voiced or unvoiced information from the signal frequency by selectively notching it out. The input amplifier 224 amplifies the resulting signal to an appropriate level to operate the pitch extractor 231, memory banks 3 and 4, and analog switch 221.

During the first record cycle of memory 3, memory 4 is being scanned by the $\overline{CL}/4$ clock pulses through gates 217 and 225. The $\overline{CL}/4$ frequency is generated by flip-flops 226 (FF 16), and 277 (FF 17), by dividing the clock 229 by 4.

The memory output (IN 1) of analog switch 221 is selected during the set of FF 13, thus feeding divided stored noise into the SSB unvoiced multiplier 207. Analog switch 222 continues to select input 2 (IN 2) until FF 13 is reset. This results in filling the first divided pitch cycle recording gap with unvoiced information.

At the beginning of the second cycle, the pitch extractor 231 does the following: (a) it resets FF 13 through OS 11, which sets flip-flop 232, which selects (IN 1) of analog switch 222, (b) it changes the state of FF 11, thus closing gate 234 and opening gate 201 for recording the second cycle into memory 4, (c) it changes the state of flip-flop 233 (FF 12) (through OS 11), which opens gate 235 and closes gate 221. When gate 235 opens, $\overline{CL}$ drives the playback sequencer 239 of memory 3 at four times the record frequency, or at $\overline{CL}$.

$\overline{CL}$ is applied from gate 240 during the time that voiced-unvoiced tone receiver 205 is in the voiced mode. Inverter 242 inverts the high output of receiver 205 to a low input to gate 240, thereby opening gate 240.

Both memories 3 and 4 contain 128 bits of memory. However, since $\overline{CL}$ is a fixed frequency at 7,500 c.p.s., the number of bits actually used during the open time of gates 209 or 201 is dependent on the basic pitch cycle. Therefore, the record sequencer will always stop at some count below 128.

The function of the counter comparator gates 241 and 243 is to generate a pulse every time, during playback, that the playback sequencer reaches the same count that the record sequencer stops at. This pulse is then applied through gate 234 (if memory 3 is being played back) to one-shot multivibrator 245 (OS 16), which resets the playback sequencer 239 of memory 3. The playback sequencer 239 of memory 3 will continue from its reset condition to reproduce for a second time the cycle stored in its memory, until the counter comparator gates 241 cause another reset, etc. Each time that the counter comparator gates 241 generate a pulse indicating one complete scan of the memorized information, the output of gate 234 is fed to a differentiator 247 which applies a set pulse to flip-flop 240 (FF 14). However, as long as FF 14 is in the SET position, FF 14 will not change state. As soon as the pitch extractor 231 produces a pulse which toggles FF 11 and changes gates 209 and 201, the record sequencer 211 of memory 3 will reset through one-slot multivibrator 251 (OS 13) and begin memorizing new information into memory 3.

Gate 271, one-shot multivibrator 273 (OS 15), and differentiator 275, which is connected to gate 271, have the same function as gate 234, OS 16, and the differentiator 247, which is connected to gate 234, for the following cycle.

The pitch extractor pulse also will reset FF 14. FF 14 will then change states again on the next output of the counter comparator gate 241, and at that time toggles FF 12, which changes the playback gates 235 and 225.

The record sequencer 211 in the expander is different from that in the compressor because in addition to a counter and gates for the selection of memory bits, it also has a buffer digital count storage that can retain the state of the counters at the time that it receives an update command. The update command is generated by gate 281 and one-shot multivibrator 283 (OS 17) for memory 3, and by gate 285 and one-shot multivibrator 287 (OS 18) for memory 4.

It is the output of the count storage that is connected to the counter comparator gates. Again, the function of the couner comparator gates is to indicate where in the memory the last bit of information was recorded, so that the playback sequencer 239 will not scan unrecorded memory, but will start over to playback repeated cycles. It is possible, however, if the pitch changes sufficiently, to begin recording in a memory before the last part of the memory is read out by the playback sequencer. Therefore, a count position memory must be maintained in the record sequencer so that the counter comparator gates can generate an output when the playback sequencer reaches the last recorded bit, which will set FF 14, which toggles FF 12, and which changes gates 235 and 237 and begins playback of the opposite memory.

As soon as the voice-unvoiced tone receiver 205 indicates unvoiced information, inverter 291 inverts the output thereof and resets FF 13, which selects (IN 2) of analog switch 222. FF 13 is then reset, selecting (IN 2) of analog switch 221. The unvoiced information, therefore, is channeled through analog switch 221 to the SSB unvoiced multiplier 207, and to analog switch 222. The output thereof is the desired reconstructed information.

Gate 293 has the same function as gate 217 for the following cycle. One-shot multivibrator 295 (OS 14) produces the reset pulse for the record sequencer 297 of memory 4. One-shot multivibrator 299 (OS 12) provides the set pulse for FF 12 and FF 15.

Figure 7:
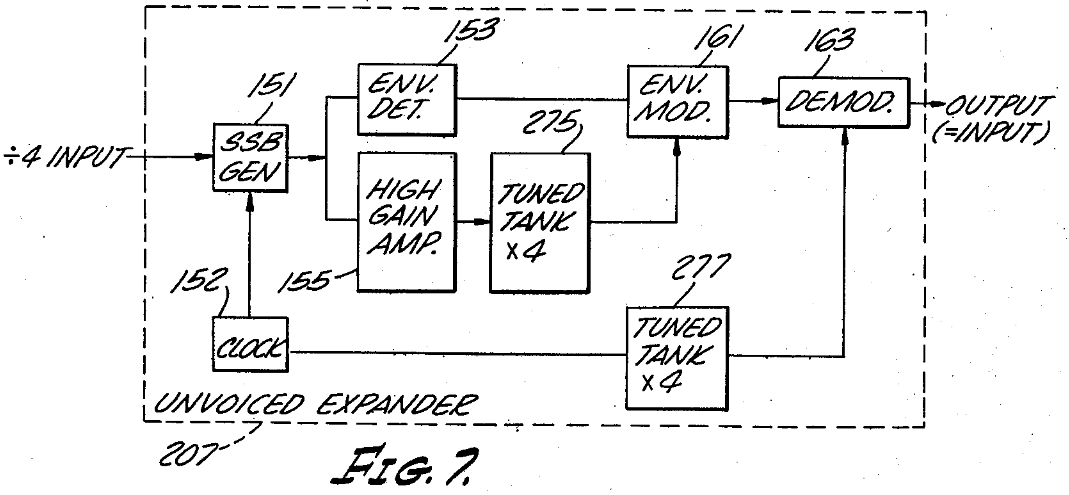
FIGURE 7 is a block diagram of the unvoiced expander shown in FIGURE 5.

FIGURE 7 is a block diagram of the unvoiced expander or multiplier 207 shown in FIGURE 5. All the blocks are the same as in the unvoiced compressor 107 shown in FIGURE 4, except that the flip-flop dividers 157 and 165 are replaced by tuned-tank times 4 multipliers 275 and 277, respectively. The output of the expander, therefore, is almost equal to the input of the compressor and very accurately reproduces the unvoiced sounds.

It is to be understood that the preceding description is for a divide-by-four compressor and the corresponding expander, for the sake of clarity and by way of example only. Any other division factor may be just as easily selected.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

We claim:

1. A bandwidth compressor circuit comprising:
(a) a voiced compressor including:
(1) first and second memory means,
(2) sampling means which, where $n$ is greater than 1, selects successive $n$th pitch cycles from the input to said voiced compressor and causes them to be stored in said first and second memory means alternately,
(3) logic means which causes whichever one of said memory means that is not being recorded into, to be read out at a rate of $1/n$ times the rate at which the pitch cycle was recorded therein, and
(4) a pitch extractor which defines the duration of each basic pitch cycle for proper synchronization of recording and playback by said logic means,
(b) an unvoiced compressor, and
(c) a voiced-unvoiced detector, the input of which is coupled to the inputs of said voiced and unvoiced compressors and to input signal means, said detector switching said voiced compressor on when the input signal contains voiced information, and said detector switching said unvoiced compressor on when the input signal does not contain voiced information.

2. A circuit as defined in claim 1 in which each of said memory means comprises a record sequencer, a playback sequencer and analog storage means.

3. A circuit as defined in claim 2 in which said sampling means includes a first gate coupled to the record sequencer of said first memory means and a second gate coupled to the record sequencer of said second memory means, so that each succesive pitch cycle sample is recorded into said first and second memory means alternatively.

4. A circuit as defined in claim 2, in which said logic means includes gate means for controlling the record and playback functions of said first and second memory means to compensate for any increase or decrease in pitch frequency between sampled cycles.

5. A circuit as defined in claim 1 in which the output of said bandwidth compressor circuit is coupled to a bandwidth expander circuit comprising:
(a) a voiced expander including:
(1) third and fourth memory means,
(2) second sampling means which selects successive cycles from the input to said voiced expander and causes them to be stored in said third and fourth memory means alternately,
(3) second logic means which causes whichever one of said third and fourth memory that is not being recorded into, to be read out at a rate $n$ times the rate at which the pitch cycle was recorded therein, and
(4) a second pitch extractor which defines the duration of each basic pitch cycle for proper synchronization of recording and playback by said second logic means,
(b) an unvoiced expander, and (c) a second voiced-unvoiced detector, the input of which is coupled to the inputs of said voiced and unvoiced expanders and to the output of said bandwidth compressor circuit, said second detector switching said voiced expander on when the input signal to said bandwidth expander circuit contains voiced information, and said second detector switching said unvoiced expander on when the input signal to said bandwidth expander circuit does not contain voiced information.

6. A circuit as defined in claim 5 in which each of said third and fourth memory means comprises a record sequencer, a playback sequencer and analog storage means.

7. A circuit as defined in claim 6 in which said second sampling means includes a first gate coupled to the record sequencer of said third memory means and a second gate coupled to the record sequencer of said fourth memory means, so that each successive pitch cycle sample is recorded into said third and fourth memory means alternately.

8. A circuit as defined in claim 6, in which said second logic means includes gate means for controlling the record and playback functions of said third and fourth memory means to compensate for any increase or decrease in pitch frequency between sampled cycles.

References Cited

UNITED STATES PATENTS 2,810,787 10/1957 Di Toro ------- 179—15.55 XR

KATHLEEN H. CLAFFY, Primary Examiner

BARRY P. SMITH, Assistant Examiner